United States Patent [19]
Cochran et al.

[11] 3,809,886
[45] May 7, 1974

[54] DYNAMIC TOMOGRAPHY WITH MOVABLE TABLE

[75] Inventors: Gary D. Cochran; David A. Crosby; Peter A. Franken, all of Ann Arbor, Mich.

[73] Assignee: CFC Products, Inc., Ann Arbor, Mich.

[22] Filed: Nov. 26, 1971

[21] Appl. No.: 202,494

[52] U.S. Cl. .................. 250/323, 250/52, 250/491
[51] Int. Cl. ............................................ G01n 23/00
[58] Field of Search .................................... 250/61.5

[56] References Cited
UNITED STATES PATENTS

| | | | |
|---|---|---|---|
| 3,499,146 | 3/1970 | Richards | 250/61.5 |
| 2,916,627 | 12/1959 | Rolke | 250/61.5 |
| 3,082,322 | 3/1963 | Koerner et al. | 250/61.5 |
| 2,491,224 | 12/1949 | Stava | 250/61.5 |
| 2,793,296 | 5/1957 | Peterson, Jr. | 250/61.5 |

*Primary Examiner*—James W. Lawrence
*Assistant Examiner*—B. C. Anderson
*Attorney, Agent, or Firm*—Reising, Ethington and Perry

[57] ABSTRACT

Method and apparatus are disclosed for producing a set of radiographs for use in dynamic tomography. The radiographs in a set are produced by using a stationary holder for the recording medium, such as a rapid film changer. The source of radiation is disposed opposite the stationary holder and the object to be radiographed is disposed on a movable support member in the path of the beam of radiation. An axis of the beam intersects a selected point in the object and a selected point in the holder on the surface of the recording medium for each position of the source of radiation and the support member. The source is energized at each succeeding position to expose the medium and the radiation falls on the same area of the holder in each such position. In the preferred embodiment the support member is moved in synchronism with the source and the source is energized at time intervals which define the several successive positions. With this arrangement, a fixed film holder may be used and a minimum of film area is required for the set of radiographs.

11 Claims, 6 Drawing Figures

PATENTED MAY 7 1974 3,809,886

INVENTORS
Gary D. Cochran,
BY David A. Crosby, &
Peter A. Franken

McGlynn, Reising, Milton & Ethington
ATTORNEYS

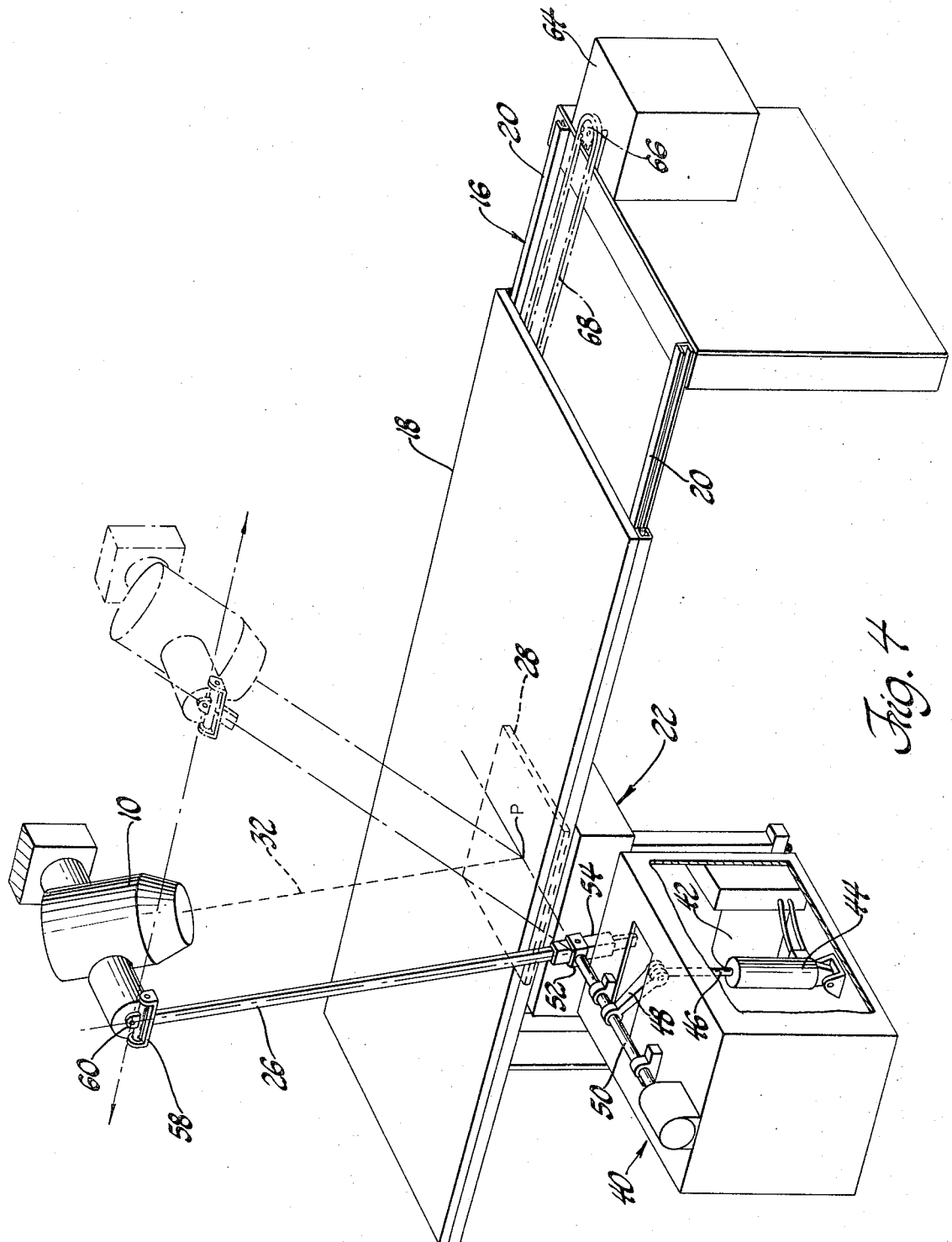

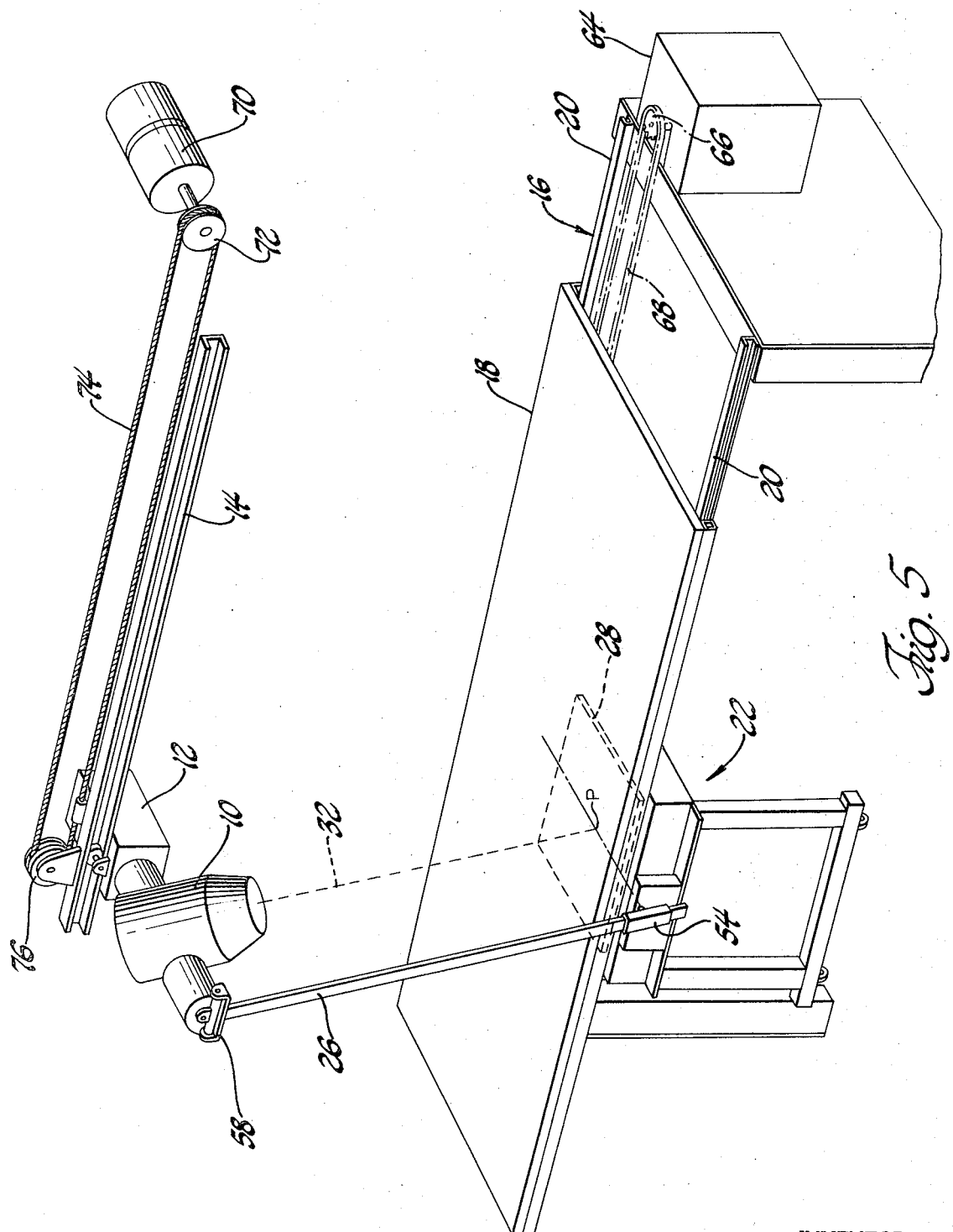

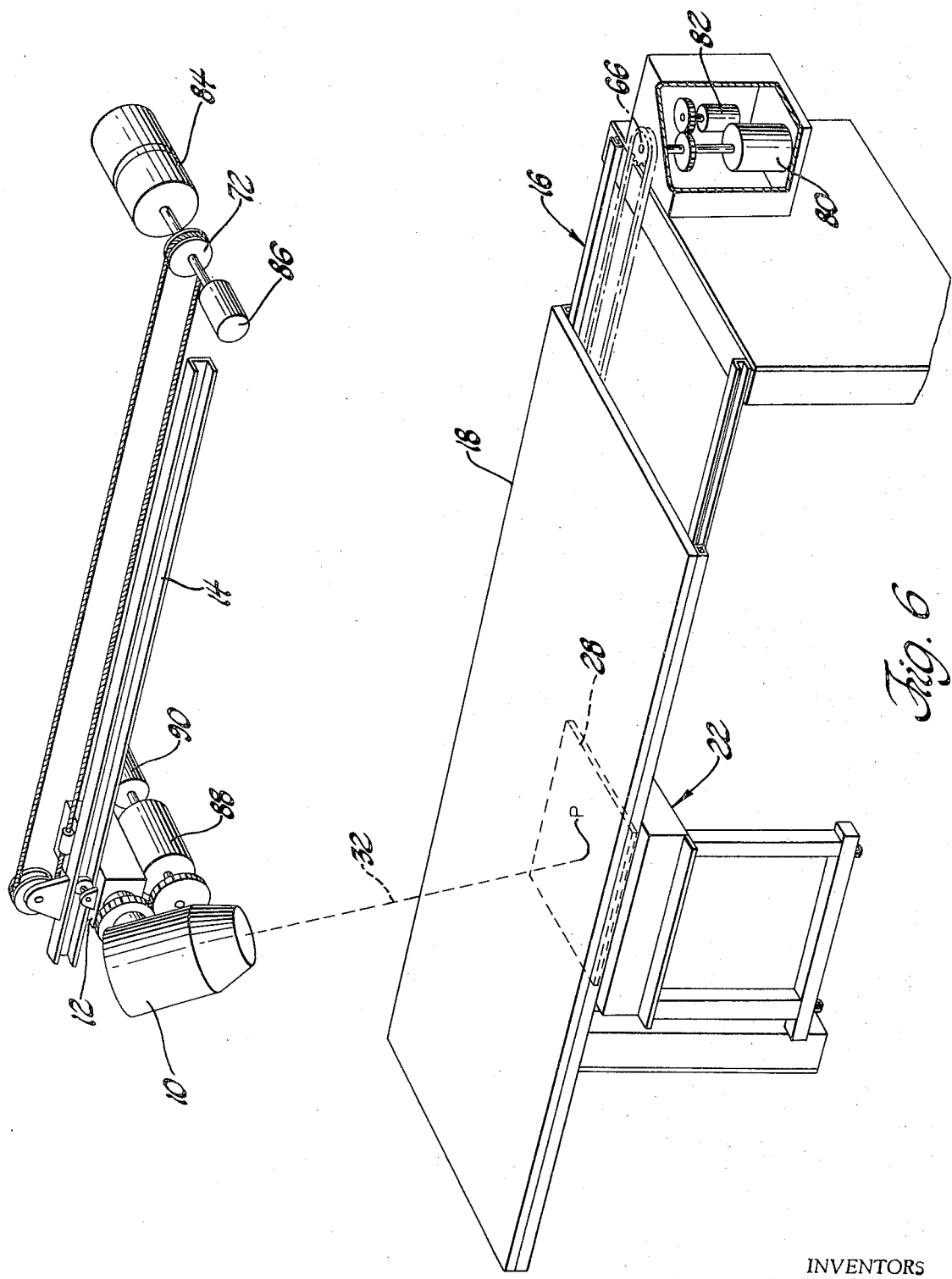

DYNAMIC TOMOGRAPHY WITH MOVABLE TABLE

This invention relates to tomography and more particularly to a method and apparatus for use in dynamic tomography to produce a set of radiographs.

In conventional tomography a single body section radiograph is produced by an integrating exposure of a single film at different angles through the body or object with the positioning of the radiation source and the receiver by a so-called tomographic movement. One tomographic movement is that which would be achieved by mounting an X-ray source and the receiver at opposite ends of a rigid lever which has an actual pivot point in the plane of the body section of the object being radiographed. In this technique the resulting radiograph contains an unobstructed image of the details in the body section or plane of interest while the images of details located in the overlying and underlying planes are obscured or smeared out, thereby revealing a clear view of the selected plane. This technique produces what is sometimes referred to as a virtual focus of the X-rays to produce a sharp image definition of the details in the selected plane. Although conventional tomography has been a highly useful diagnostic device, it does have the disadvantage of requiring a separate multiple exposure radiograph for each selected plane and the plane must be selected before the radiography begins. The selection of the desired plane may require the trial and error process of making several radiographs and each radiograph requires a significant amount of time and dosage of radiation. Conventional tomography is sometimes referred to as laminagraphy or body-section radiography and these terms are often used interchangeably in the literature.

Tomographic movement may be executed with the ray source and the recording medium being constrained to paths of movement within planes parallel to the plane of interest or reference plane. Such movement is herein termed planar tomography. The path of movement of the ray source and the recording medium within the given planes may be along an arcuate path, such as circular, spiral, elliptical or hypocycloidal, in order to obtain desired results. Whenever the plane which passes through the path of the source and a point on the receiver does not rotate with respect to the object the tomographic movement is termed linear and the technique is called linear tomography. In the planar motion the source moves in a straight line. Tomographic movement may also be executed with the ray source and recording medium movable in paths which describe circular arcs about a fixed point lying in the reference plane. This tomographic movement may be termed non-planar tomography and the motion of the radius arms may be linear or arcuate to obtain the desired results.

As mentioned above, in conventional tomography, the tomographic movement is typically produced by holding the object stationary and moving the X-ray source and the recording medium simultaneously in opposite directions above a pivot point lying in a plane through the object. It has also been proposed in conventional tomography to produce the same relative motion of the parts by holding the X-ray source stationary and moving the object and the recording medium in synchronism as disclosed in the Kieffer U.S. Pat. No. 2,400,516 for example. It has also been suggested that similar relative movement for conventional tomography may be obtained by holding a selected one of the parts stationary and moving the remaining two as in the Pohl U.S. Pat. No. 2,000,497. It is to be noted that in conventional tomography, with the object stationary, simultaneous movement of the X-ray source and the recording medium is necessary to prevent blurring of the selected plane. It follows also that if the X-ray source or the recording medium is held stationary and the other is moved, then the object must be moved synchronously in order to avoid blurring of the selected plane.

Dynamic tomography is a technique for producing an image of any selected plane or body-section without need for identifying it before the radiography begins and represents a significant improvement over conventional tomography. Dynamic tomography, which is sometimes referred to as variable depth laminagraphy, is described in U.S. Pat. No. 3,499,146 granted to Albert G. Richards on Mar. 3, 1970 for "Variable Depth Laminagraphy with Means for Highlighting the Detail of Selected Lamina." The technique of dynamic tomography is also described in the paper entitled "Variable Depth Laminagraphy" by Albert G. Richards, Proceedings, Instrument Society of America Bio-Medical Sciences Instrumentation — Volume VI, Oct., 1969. Dynamic tomography, as described in these references, utilizes a planar tomographic movement and may be achieved with the effective pivot point of the linkage being disposed in a plane through the object with separate images being recorded for each of multiple exposures which are made at different angles through the object, i.e., a different film or other recording medium is used for each exposure to produce a set of radiographs. The set of radiographs may then be superimposed in a stack for viewing and with the radiographs aligned so that the images of a given point in the object all coincide, all other points or object details in the same plane will be revealed in an unobstructed view and images of all points lying in other planes, even closely adjacent planes, will be obscured or blurred out. Assuming, for instance, the use of cut films with the image of a given point in the reference plane falling at the center of each film for each exposure angle, a virtual focus of the reference plane is achieved and the images of the given point are superimposed when the radiographs are superimposed directly on top of each other. If the given point lies between the reference plane and the film, the images of the given point on the respective radiographs will be superimposed and the plane through the given point will be brought into virtual focus when the radiographs are shifted relative to each other in one direction parallel to the tomographic movement, i.e., the track direction. On the other hand, if the given point lies between the reference plane and the source the images of the given point will be superimposed with the respective radiographs shifted relative to each other in the opposite direction parallel to the tomographic movement. Any desired plane may be brought into virtual focus by relative shifting of the set of radiographs to superimpose the images of a point lying in the plane of interest. In this relationship the multiple images on the different radiographs of the same point reinforce each other; accordingly each radiograph may be made with reduced exposure according to the number of radiographs in the set and the density of the composite image is comparable to that of an ordinary radiograph.

In dynamic tomography difficulty has been encountered in using the tomographic movement of conventional tomography wherein the recording medium is moved between the exposures. This poses a problem because dynamic tomography requires the changing of film between exposures and in order to produce the set of radiographs in short time, a so-called rapid film changer must be used. Rapid film changers are heavy and bulky and do not lend themselves to such movement and furthermore it is not feasible in the time allowed for making a set of radiographs to manually change the film between exposures.

It has been proposed heretofore to obviate this difficulty by utilizing a stationary film holder and moving the X-ray source so that the axis thereof intersects the film plane at the same point for all positions of the source. This arrangement, however, introduces another disadvantage in that the radiation which penetrates the object falls on a different portion of the film holder for each different position of the source. Consequently the film changer must accommodate a film which is large enough to intercept the radiation penetrating the object for all different positions of the source and this results in a waste of film and requires a film changer with a capacity for large area film.

The present invention provides a method and apparatus for making a set of radiographs for dynamic tomography which requires minimum area of recording medium, such as X-ray film for the entire set. This is accomplished by producing a relative movement between the radiation source and the recording medium, holding one or the other stationary, and producing movement of the object in synchronism with the relative motion. Such an arrangement enables the exposure of the recording medium with the axis of the penetrating beam intercepting the object and the recording medium at approximately the same respective points and at different angles for several different exposures to produce the set of radiographs. Preferably this is accomplished with a fixed or stationary holder for the recording medium such as a rapid film changer. For this purpose the source of radiation is disposed opposite the stationary holder and the object to be radiographed is disposed on a movable support member therebetween in the path of the beam of penetrating radiation. An axis of the beam intercepts a selected point in the object and a selected point in the holder on the surface of the recording medium and the source is energized to produce a first radiograph. The source is moved to successive plural positions so that the beam axis intercepts the selected point in the holder in each position and the support member, with the object thereon, is moved in the same direction so that in each position the axis of the beam intercepts the object at a different angle and at approximately the same selected point. The source is energized at each succeeding position to expose the medium to the radiation with the axis of the beam intercepting both of the selected points, the radiation thereby falling on the same area of the holder in each position with the recording medium therein be being changed for each exposure. In the preferred embodiment the support member is moved in synchronism with the source and the source is energized at time intervals which define the several successive positions.

The apparatus for carrying out the invention comprises a fixed holding means for the changeable recording medium and means for moving the radiation source in a predetermined path with the axis of the beam of radiation directed toward a selected point in the holding means on the surface of the medium. Support means for the object to be radiographed is provided with drive means for moving the same so that the axis of the beam intercepts the object at a different angle and at approximately the same point for each different position so that the exposure aperture of the holding means is exposed to the radiation penetrating the object at the successive positions of the source. To obtain the desired alignment means are provided for synchronizing the translational movement of the source, the pivotal movement of the source and the translational movement of the support member with the object disposed thereon.

A more complete understanding of this invention may be obtained from the detailed description which follows taking with the accompanying drawings in which:

FIG. 4 shows a first embodiment of the drive menas of the invention;

FIG. 5 shows a second embodiment of the drive means; and,

FIG. 6 shows a third embodiment of the drive means for the invention.

Figure 1:
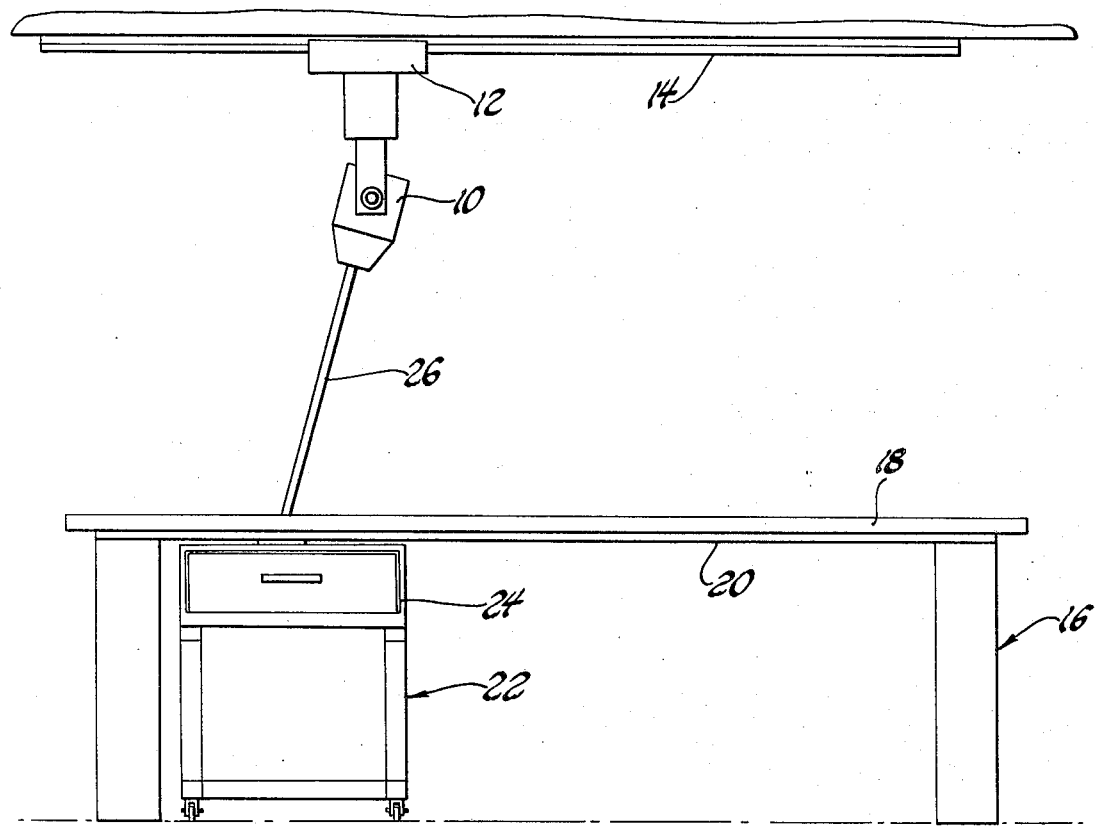
FIG. 1 shows the apparatus of the invention for dynamic tomography in a typical arrangement.

Referring now to the drawings, there is shown in FIG. 1 an exemplary embodiment of the invention in X-ray apparatus for performing dynamic tomography in accordance with the present invention. The apparatus comprises a source 10 of penetrating radiation such as an X-ray source which is supported by a pivotal connection on a movable carriage 12. The carriage 12 in turn is mounted for translational linear movement on a fixed track 14 which is mounted on the ceiling of an X-ray room. A table 16 is disposed with its legs in a fixed position on the floor of the X-ray room. The table is provided with a movable table top 18 which is mounted upon a set of fixed rails 20 for movement in a direction parallel to the translational movement of the X-ray head 10. A holder 22 for a changeable recording medium, such as cut X-ray film, is disposed in a suitable position under the movable table top 18. The holder 22 is preferably a rapid film changer of the type including a magazine 24 mounted upon a suitable floor stand which may be positioned as desired beneath the table. The magazine 24 is of the type which is loaded with a plurality of cut X-ray films which, under the control of the rapid film change mechanism, are positioned successively in an exposure aperture of the holder which defines the film plane for exposure to the penetrating radiation in the making of a radiograph. As is well known, the rapid film changer may be set for variable rate operation and includes means to energize the X-ray source in each cycle of operation after a film is placed in position for exposure. As shown in the arrangement of FIG. 1 the X-ray source 10 and the film changer 22 are interconnected by a tomographic linkage 26 which has a pivot point (not shown) in the film plane in the holder. This linkage controls a pivotal motion of the X-ray source 10 as the carriage 12 moves along the track 14 so that the axis of the beam of X-rays pivots about a selected point on the surface of the X-ray film in the holder.

In dynamic tomography it is not necessary to cause a given axis of the X-ray beam to pass through the same point in the object for each of the different radiographs. It is sufficient if the axis of the beam intercepts the object at a different angle for each radiograph, provided that the area of the film is large enough to receive the image of volume of interest on each of the different radiographs. In dynamic tomography the X-ray source is energized while it is effectively at a standstill relative to the film, so there is no motionally induced blurring of the image. On the other hand, in conventional tomography it is required that the given axis of the X-ray beam pass through the same point in the object for all positions of the source and the film, otherwise the image of the selected plane containing the point will be blurred.

Figure 2:
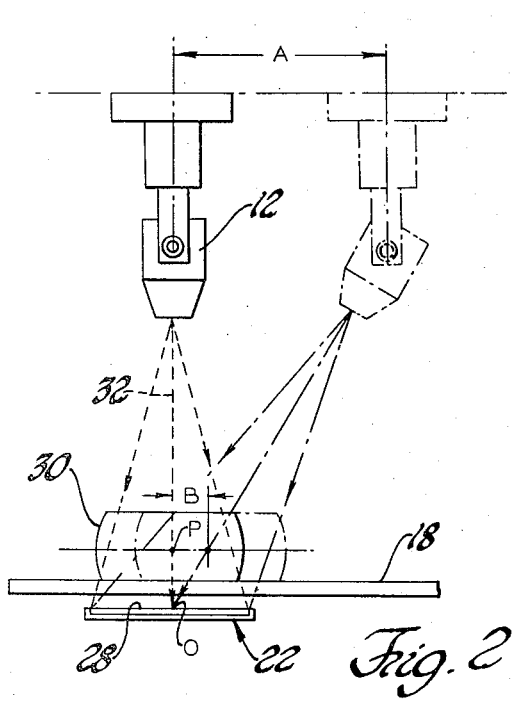
FIG. 2 is a diagrammatic representation of the source, object and recording medium for explanatory purposes.

In accordance with the invention for practicing dynamic tomography with a stationary film holder, the image of the object is caused to fall on the same area in the film plane for each radiograph of a set, thereby minimizing the size of film required. In order to cause the image to fall upon the same area for different angles of exposure the support means or table top for the object is movable in a predetermined relationship with the movement of the X-ray source. The relationship required is shown in FIG. 2 wherein the parts are illustrated diagrammatically. The fixed film holder 22 contains the film 28 with the surface thereof lying in the film plane of the holder. The object 30 is disposed on a movable table 18 in a position directly overlying the film holder. The X-ray source 12 emits a beam of X-rays having an axis 32 which intercepts a selected point P in the object and also intercepts a central point 0 on the surface of the film 28. It can be seen in this diagram that the image of the object, particularly the image of the plane through the point P is coextensive with the plane of the film 28. When the X-ray source 12 is moved along its path of travel through a distance A to produce another radiograph, the X-ray source 12 is pivoted in order to maintain the axis at the appropriate angle so that it intercepts the point O on the surface of the film 28. In order that the image of the object 30, particularly the image of the plane through the point P will fall upon the same area of the film holder 22 the support table 18 is moved in the same direction as a source through the distance B. Accordingly the axis 32 of the X-ray beam intercepts the point P and the point O and the image of the plane through point P is coextensive with the same area of the film holder 22. It will now be appreciated that the film for each radiograph need only be large enough to accommodate the image of the object or an exposure taken normal to the body sections of interest. As indicated in FIG. 2 the X-ray source 12 and the object 30 are positioned for each radiograph so that the axis 32 of the X-ray beam intercepts both the point P and the point 0. This relationship may be achieved by synchronous movement of the X-ray source 10 and the object 30, with the ratio of movement such that the axis 32 continuously intercepts both points P and O.

Referring now to FIG. 4, there is shown an embodiment of the inventive apparatus with a single power unit for causing translational and pivotal movement of the X-ray head and a separate power unit for movement of the table. As shown in FIG. 4 the table 16 with its movable table top 18 is disposed beneath the X-ray head 10 in alignment with the track (not shown) for the X-ray head. The film holder 22 suitably in the form of a rapid film changer is positioned at a desired location beneath the table 16. A power unit 40 for imparting motion to the X-ray head is disposed alongside the table.

The apparatus comprises a power unit 40 which includes an electric motor driven hydraulic pump 42 which is hydraulically connected with a hydraulic servo 44. The servo includes a piston rod 46 which may be extended or retracted at an adjustable speed and which is connected through a crank arm 48 to a rotatable shaft 50. The shaft 50 is mounted for rotation with its axis lying in the film plane defined by the holder 22. A yoke 52 nonrotatably mounted on the end of the shaft 50 is connected with a sleeve 54 extending transversely of the shaft 50. A lever 26 extends through the sleeve 54 in slidable engagement therewith at its lower end and is provided at its upper end with a clevis joint 58 having the pivot plate 60 thereof connected by a pivot pin on the pivot axis of the X-ray head 12.

When the servo 44 is energized at a selected speed the rotary shaft 50 and hence the pivot arm 26 is caused to swing about the axis of the shaft 50. The X-ray head 12 is driven by the pivot arm 26 so that it moves translationally along the direction of the track (not shown) and is pivoted so that the axis 32 of the X-ray beam continuously intercepts the axis of the shaft 50 at the point P.

The table 16 is provided with an electric motor 64 which is adapted to provide the motive power for moving the table top 18 forward and backward along its longitudinal axis. For this purpose the motor shaft is provided with a drive sprocket 66 which drives a chain 68, which in turn is connected to the underside of the table top 18 in a conventional manner. The table top 18 is mounted on the tracks 20 by rollers in a conventional manner.

In operation of the apparatus of FIG. 4 the object to be radiographed is positioned on the movable table top 18 and the initial alignment of the X-ray head is made with the object. The speed of the power unit 40 for driving the X-ray head 10 is set in accordance with standard procedure for the radiographs to be taken. The speed of the table for moving the object is also set by controls for the motor 64 so that the X-ray head and the object are moved in substantial synchronism. The ratio of speed is established so that the axis of the beam 32 extends approximately through the point O in the film plane and the selected point P in the object. It has been found that the speed control of the servo 44 and the motor 64 are sufficient to maintain the desired degree of synchronism for the intended purpose.

Referring now to FIG. 5, there is shown a different embodiment of the invention in apparatus for dynamic tomography. In this embodiment the table 16 is of the same construction as described with reference to FIG. 4 and includes the same variable speed drive arrangement for the table top 18. The X-ray head 10 is mounted on a carriage 12 which in turn is mounted on a pair of tracks 14, only one of which is shown in the drawings. The carriage 12 is driven by a variable speed electrical motor 70 which is fixedly mounted adjacent the track 14. The shaft of the motor 70 is provided with a drive pulley 72 which drives a cable 74 which extends over an idler pulley 76 and is connected at an intermediate point to the carriage 12. The film holder 22 as described with reference to FIG. 4 is disposed beneath the table top 18. In order to impart pivotal motion to the X-ray head 10 as it is moved translationally along the track 14 the pivot arm 26 is provided. In this embodiment the upper end of the pivot arm 26 is connected by the clevis joint 58 to the pivot axis of the X-ray head 10 and is driven thereby. The lower end of the pivot arm 26 is provided with a lost motion connection including the sleeve 54 which is fixedly mounted on a rotatable shaft having an axis of rotation extending in the film plane defined by the holder 22. The operation of the apparatus shown in FIG. 5 is much the same as that described with reference to FIG. 4. The speed of the X-ray head 10 is set by the speed control on the motor 70 and the speed of the table movement for the object to be radiographed is adjusted accordingly so that the axis of the beam of X-rays will pass through the same point in the object for all positions of the table. The speed control settings for the drive motors has been found to be adequate to provide the desired degree of synchronism of the movement of the source and the object.

In FIG. 6 there is shown another embodiment of the invention which obviates the need for a mechanical linkage between the X-ray head and the film changer. In this embodiment the table 16 is of the same construction as that described with reference to FIG. 4, however, the drive means for the table top 18 comprises an electrical servo motor 80 connected to the drive sprocket 66. For purposes to be discussed presently, a synchro control transformer 82 is driven by the shaft of the servo motor 80. The film holder 22 is positioned beneath the table top 18 as previously described. The drive means for the X-ray head 10 includes the carriage 12 mounted on the track 14, as previously described; however, a variable speed servo motor 84 is used to drive the pulley 72 and, for purposes to be described, a synchro generator 86 is shaft connected to the motor 84 and is driven thereby. In order to control the pivotal motion of the X-ray head 10 a servo motor 88 is mounted on the carriage 12 and connected by a suitable gear train to the pivot shaft of the X-ray head 10. A synchro control transformer 90 is shaft connected with the motor 88 and is driven thereby. The variable speed motor 84 serves as the master drive and establishes the speed of the translational movement of the X-ray head along the track. The servo motor 80 for the table top and the servo motor 88 for the pivotal motion of the X-ray head are controlled through the interconnection of the synchro units mentioned above to assure synchronous movement of the elements of the system.

Figure 3:
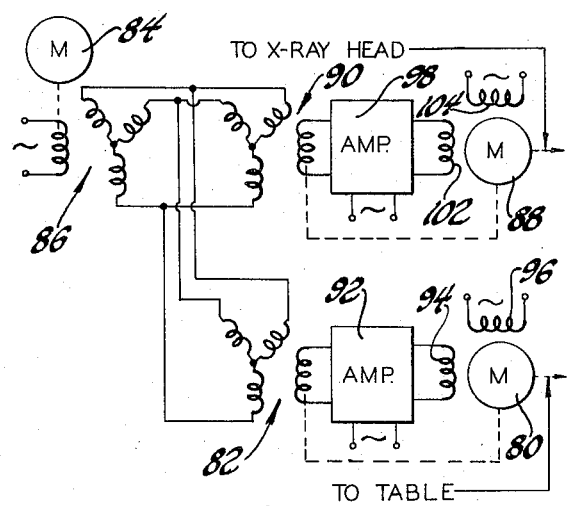
FIG. 3 shows a schematic diagram of synchronizing means which may be used in the embodiment of FIG. 5.

The electrical system for synchronizing the movement of the X-ray head and the table top is shown schematically in FIG. 3. The variable speed drive motor 84 is shaft coupled to the rotor of the synchro generator 86 and the single phase winding of the rotor of the generator 86 is excited with an alternating current from the AC supply lines. The stator of the synchro generator 86 carries three-phase Y-connected winding which is connected to the stator winding of the same configuration of the synchro control transformer 82. The rotor winding of the transformer 82 is electrically connected to the input of the servo amplifier 92 which is provided an alternating supply voltage from the supply voltage lines as indicated. The output of the servo amplifier 92 is connected to the reversible phase winding 94 of the servo motor 80 which has its reference phase winding 96 energized from the alternating supply voltage lines. The motor 80 is shaft coupled to the rotor of the control transformer 82 and of course it is shaft coupled to the table drive mechanism. In a similar fashion the stator windings of the synchro generator 86 are connected to the stator windings of the synchro control transformer 90. This transformer has its rotor winding connected to the input of a servo amplifier 98 which is provided with an alternating voltage supply from the alternating voltage supply lines. The output of the amplifier 98 is connected with the reversible phase winding 102 of the servo motor 88 which has its reference phase winding 104 connected with the alternating voltage supply lines. The servo motor 88 is shaft coupled to the rotor of the control transformer 90 and is also shaft coupled to the pivot drive mechanism of the X-ray head 10.

In operation of the synchronizing arrangement of FIG. 6 the servo motors 80 and 88 are maintained in exact synchronism with the variable speed drive motor 84. Such synchronous tie arrangements are well known, per se, and suffice it to say that any relative angular displacement between the rotor of a synchro control transformer and the rotor of the synchro generator causes an error voltage to be developed in the control transformer which is of amplitude and phase corresponding to the magnitude and direction of the positional error. This error signal, through the servo amplifier, is effective to modify the energization of the servo motor to correct the error and maintain positional disagreement at exceedingly low values.

The operation of the apparatus as shown in FIG. 6 is much the same as that described with reference to FIG. 5. The X-ray head is initially positioned and aligned with the axis 32 intersecting the selected point in the film plane. The speed of the drive motor 84 is set in accordance with standard procedure in accordance with the radiographs to be made. With the system energized, the motion of the X-ray head along the track is produced by the motor 84 and, through the synchronous control arrangement, the pivotal motion of the X-ray head 10 is controlled by the servo motor 88 and the motion of the table top 18 is controlled by the servo motor 80.

Although the description of this invention has been given with reference to a particular embodiment thereof, it is not to be construed in a limiting sense. Many variations and modifications will now occur to those skilled in the art. For a definition of the invention reference is made to the appended claims.

We claim:

1. In a method of making a set of radiographs for dynamic tomography comprising the steps of disposing a radiation source in a first position opposite a holder with a changeable recording medium therein, said source being adapted when energized to emit a beam of penetrating radiation, disposing the object to be radiographed on a support member in a position between the radiation source and the holder in the path of said beam, with an axis of said beam intercepting a selected point in said object and a selected point in said holder on the surface of the recording medium, energizing the source to produce a first radiograph on said medium, moving the source and holder relative to each other to successive plural positions so that the beam axis intercepts said selected point in the holder in each position, wherein the improvement comprises; moving the support member with the object thereon in the same direction as the movement of said beam so that the axis of the beam intercepts the object at a different angle at each successive position and approximately at said selected point in the object, energizing the source at each of said succeeding positions to expose said medium to said radiation, with the axis of the beam passing in the vicinity of both of said selected points, whereby the required area of said medium is minimized for the radiograph of said object for each of said positions, and changing the recording medium before each exposure.

2. The invention as defined in claim 1 wherein the step of moving the source and holder relative to each other is accomplished by keeping the holder fixed in position and moving the source through a predetermined path of movement.

3. The invention as defined in claim 1, including the steps of moving the support member in synchronism with the source from the initial position through the successive positions and energizing the source at predetermined time intervals to define said position.

4. In apparatus for making a set of radiographs for dynamic tomography comprising a fixed holding means adapted to receive a changeable recording medium, a radiation source adapted when energized to emit a beam of penetrating radiation, first support means for said source, said first support means being movable for moving the source in a predetermined path with an axis of said beam of radiation directed toward a selected point in the holding means on the surface of said recording medium, second support means adapted to receive an object to be radiographed, said holding means including means to change the recording medium after said source is energized, wherein the improvement comprises said second support means being movable, drive means for moving the second support means so that the axis of the beam intercepts the object at a different angle and at approximately the same point in the object for each different position of the source in its predetermined path whereby the same portion of said holding means is exposed to the radiation penetrating said object at each of plural positions of said source and the required area of said medium is minimized for said radiographs.

5. Apparatus as defined in claim 4 including means operatively connected between the first and second support means for synchronizing the movement thereof in a predetermined ratio.

6. The invention as defined in claim 4 wherein said first support means moves said source in a straight line path and concurrently rotates said source so that the axis of said beam rotates about said point in said holding means.

7. The invention as defined in claim 6 including drive means for the first support means and comprising a motor connected with a rotatable shaft having its axis of rotation disposed in alignment with the plane of said recording medium and through a selected point on the surface thereof, a lever arm extending transversely of said shaft and nonrotatably connected therewith, said lever arm being connected with said radiation source to move it through said predetermined path.

8. The invention as defined in claim 7 wherein said first support means comprises a track, a carriage on said track and adapted to traverse the track, said source being pivotally mounted on said carriage, said lever arm being nonrotatably connected with said source and extending in the direction of said axis of said beam, and a slidable connection between said shaft and said lever arm whereby rotation of said shaft causes concurrent rotation of said lever arm and said beam axis and movement of said source along said track.

9. The invention as defined in claim 6 wherein said first support means comprises a track, a carriage movable on said track, said source being pivotally mounted on said carriage, a drive motor connected with said carriage to cause the carriage to traverse said track, a lever arm nonrotatably connected with said source, a pivotal support for said lever arm defining a pivot axis in the plane of and extending through said recording medium whereby said drive motor causes said carriage to traverse the track and move the source in a linear path and said lever arm causes concurrent rotation of said source on the carriage to rotate the axis of said beam about the point on the surface of said recording medium.

10. The invention as defined in claim 6 wherein the first support means comprises a track, a carriage movable on said track, said source being rotatably mounted on said carriage, a first drive motor operatively connected with said carriage for causing it to traverse said track, a second drive motor connected with said source for rotating it about a transverse axis to determine the direction of the axis of said beam and synchronizing means connected between said drive motors to cause the concurrent linear and angular movement of said source so that the axis of said beam rotates about a point lying in the surface of said recording medium.

11. The invention as defined in claim 10 wherein said first drive means includes speed adjusting means whereby the speed of said carriage along the track may be preselected.

* * * * *